UNITED STATES PATENT OFFICE 1,975,672

PREPARATION OF BUTTER SUBSTITUTES

Hans W. Vahlteich, New York, N. Y., assignor to The Best Foods, Inc., New York, N. Y., a corporation of New Jersey No Drawing. Application May 24, 1930, Serial No. 455,462

13 Claims. (Cl. 99—13)

This invention relates to the preparation of a food product and more particularly to an improvement in the preparation of animal and vegetable substitutes for butter, such as oleomargarine.

In the preparation of oleomargarine a carefully cultured milk is churned with a refined animal or vegetable oil or a mixture of such oils to produce an emulsion of oil and water which is usually a water-in-oil emulsion. This emulsion is chilled and the solidified product is subsequently worked and blended with salt to produce the finished butter substitute.

In the preparation of such butter substitutes it is, of course, very important that the characteristics of dairy butter be approximated as closely as possible. The flavor of the finished product is of particular importance and the desired flavor should not be hidden or altered by objectionable flavors from materials which are added or which are formed during the preparation of the butter substitute.

Butter substitutes made in the usual manner do not have the suitability for certain uses to which butter is normally applied, for example, in frying or baking food products, because the ingredients separate at the increased temperatures encountered in frying and baking and, in frying, the material being fried sticks to the pan.

It has been suggested that small quantities of lecithin, derived from the yolk of egg or from a vegetable product, such as soya bean oil, be added to the ingredients to be emulsified for the purpose of increasing the dispersion of the internal or discontinuous phase. It has been found, however, that when such material is added the resulting product is objectionable for use in frying, since it becomes discolored at the temperatures to which it is subjected during the frying and gives an objectionable appearance to the food product. Furthermore, the flavor of the butter substitute made in this manner is also objectionable. It has also been suggested that a highly oxidized soya bean oil be added to the ingredients to be emulsified for the purpose of increasing the dispersion of the internal phase. This highly oxidized material, however, gives an objectionable flavor and color to the butter substitute and because of this it cannot be used satisfactorily without further purification.

It is an object of this invention to produce a better butter substitute, which is of light color and suitable flavor and which will more closely approach butter in its baking and frying qualities. Another object of the invention is to improve the spreadability of the butter substitute. A further object of the invention is to produce a dispersing agent which may be added to the ingredients to be emulsified and which dispersing agent will assist in producing a butter substitute of the improved characteristics referred to above. Other objects will become apparent.

I have found that if an edible oil of relatively high iodine number, such as soya bean oil, is subjected to a slight or partial oxidation and is subsequently blown with steam, preferably under a vacuum and at an elevated temperature, the resulting product is relatively light in color and may be added to the ingredients of the butter substitute. This material will act as a dispersing or emulsifying agent to produce a light colored product having a highly dispersed internal phase, and may be used without imparting the objectionable characteristics referred to above.

Although other vegetable oils, such as peanut oil, corn oil, cottonseed oil, linseed oil, and even fish or animal oils, may be treated to produce a suitable emulsifying agent, I prefer to use soya bean oil and will describe in detail the preparation of an emulsifying agent from this oil. It is not intended, however, to limit the invention to the particular oil or to the details of procedure which are described.

The soya bean oil, having, for example, a specific gravity of about .925, is blown with air, or other gas containing free oxygen, until the specific gravity is increased by about .010 to .030 or to about .935 to .955, the specific gravities referred to herein being measured at 60° F. This oxidation process may be carried on at ordinary or at elevated temperatures but I prefer to oxidize the oil at about 80 to 120° centigrade and preferably at about 100° centigrade.

When the oxidation treatment has proceeded to the desired extent, as indicated by the increase in specific gravity, the stream of free oxygen containing gas is cut off and steam is blown through the oil until its body or viscosity is materially increased. I prefer to blow the steam through the oil while the latter is maintained at an elevated temperature and under reduced pressure, for example, at about 270 to 320° centigrade and 25 to 30 inches of mercury below atmospheric pressure, although other temperatures and pressures may be used.

The blowing with steam may be continued until the oil becomes very viscous, but should be stopped before it becomes gelatinized. To determine the viscosity in my double treated oil, a sample of it may be put in a viscosimeter which comprises a glass vial ⅜ inches in diameter and 6 inches long. The viscosimeter when filled is corked up so as to allow a small air bubble which, when resting at the side of the tube, measures one-third the diameter of the tube. The viscosity is determined by inclining the tube 60° from the horizontal and measuring the length of time required for the passage of the air bubble from one end of the tube to the other or a distance of 6 inches. I prefer to increase the viscosity, determined at 72° Fahrenheit by the above method, to not less than 15 minutes and preferably to a greater viscosity. This corresponds to a minimum of about 10½ to 11 minutes when measured by the Gardner-Holt method.

When the oil reaches the desired viscosity or body, the treatment may be stopped and the product is ready to be incorporated into the ingredients used for manufacturing the butter substitute. If more convenient, however, the oil may be mixed with a more limpid oil in order that it may be handled more easily.

In making oleomargarine about eight pounds of the oil subjected to the double treatment referred to above is added to 1000 pounds of the oil (for example, cocoanut oil) to be used in producing the oleomargarine. After the double treated oil has been mixed thoroughly with the oleomargarine oil, the mixture is churned with cultured milk and the chilled, emulsified product is subjected to working and blending with salt, in the usual manner. A greater or lesser amount of the double treated oil may, of course, be added to the oleomargarine oil with a corresponding improvement in the characteristics of the product. Also, if desired, the oil subjected to the double treatment may be added later in the process, for example on the kneading tables or in the blenders in any convenient manner known to the art for incorporating a special ingredient in margarine.

The product resulting from my improved procedure when made with properly cultured milk and carefully refined oleomargarine oil produces a butter substitute having a flavor and odor very similar to dairy butter. Because of its highly dispersed internal phase the product may carry a relatively high aqueous content without leakage of the aqueous portion from the mass. This product may be spread with greater facility than ordinary butter substitutes and it may be used in frying and baking food products, where the material is subjected to high temperatures, without the objectionable results referred to previously. Because of the relatively light color of my double treated oil, it may be applied to light colored butter substitutes without interfering with the desired color. Of course, it may also be used in more highly colored butter substitutes where it is desired to obtain the improved characteristics resulting from its use.

A product of improved characteristics may also be obtained by passing the free-oxygen-containing gas and steam through the oil at the same time, but I prefer to follow the separate steps described above.

Although I have referred to specific conditions under which a suitable product may be prepared, it is not intended to thereby restrict the invention to the particular proportions, temperatures, pressures, specific gravities, viscosities, etc., recited, it being apparent that an improved product may be obtained even though these specific conditions are varied. The improved double treated oil may also be used in the production of butter substitutes made from animal oils alone or from mixtures of animal and vegetable oils in order to obtain an improved product.

What I claim is:

1. A process for preparing a dispersing agent suitable for use in water-in-oil emulsions comprising partially oxidizing an oil at a temperature of about 80 to 120° centigrade and thereupon increasing its viscosity by blowing steam through it.

2. A process for preparing a dispersing agent suitable for use in emulsions of milk and an edible oil comprising blowing an oxygen containing gas through an oil maintained at about 80 to 120° centigrade a sufficient length of time to partially oxidize the oil and thereafter heating and blowing steam through the partially oxidized oil.

3. A process for preparing a dispersing agent suitable for use in emulsions of milk and edible oil comprising partially oxidizing an oil until its specific gravity is increased not over about .010 to .030 and thereafter heating and blowing steam through the partially oxidized oil.

4. A process for preparing a dispersing agent suitable for use in emulsions of milk and an edible oil, comprising partially oxidizing soya bean oil until its specific gravity is increased not over about 0.010 to .030 and thereafter blowing steam through the partially oxidized oil under a reduced pressure while maintained at an elevated temperature.

5. A process for preparing a dispersing agent suitable for use in emulsions of milk and an edible oil, comprising partially oxidizing soya bean oil until its specific gravity is increased not over about .010 to .030 and thereafter blowing steam through the partially oxidized oil, while the latter is maintained at about 270 to 320° C.

6. A process for treating edible oils comprising partially oxidizing an oil to increase its specific gravity by not over about .030 and thereafter blowing steam through the oil at a reduced pressure and an elevated temperature to increase its viscosity to not less than 15 minutes as defined.

7. A dispersing agent suitable for use in producing emulsions of milk and an edible oil, comprising partially oxidized soya bean oil which has been oxidized to such an extent as to increase its specific gravity by not over about .01 to .03 and having a viscosity of not less than about 15 minutes, as defined above.

8. A dispersing agent suitable for use in producing emulsions of milk and an edible oil, comprising partially oxidized soya bean oil having a specific gravity of about .935 to .955 and a viscosity of not less than about 15 minutes, as above defined.

9. A process for preparing a dispersing agent suitable for use in water-in-oil emulsions comprising partially oxidizing an oil without substantially increasing its viscosity and thereafter increasing the viscosity of the oil by heating the same to a temperature of about 270 to 320° C. in the absence of free oxygen.

10. A process for preparing a dispersing agent suitable for use in water-in-oil emulsions, comprising partially oxidizing an oil, terminating the oxidation prior to gelatination of the oil, and heating the partially oxidized oil in the absence of substantial free oxygen and with agitation to markedly increase the viscosity.

11. A process for preparing a dispersing agent, comprising partially oxidizing an oil until its specific gravity is increased not over about .01 to .03 and thereafter heating the partially oxidized oil to increase its viscosity to not more than about 15 seconds, as defined herein.

12. A process for preparing a dispersing agent, comprising partially oxidizing an oil until its specific gravity is increased not over about .01 and thereafter heating the partially oxidized oil in the absence of free oxygen to polymerize it and increase its viscosity.

13. A process for preparing a dispersing agent for use in water-in-oil emulsions, comprising partially oxidizing an oil until its specific gravity is increased by not over about 0.1, and thereafter increasing the viscosity of the partially oxidized oil by heating it to a temperature of 270 to 320° C. in the presence of steam.

HANS W. VAHLTEICH.